United States Patent
Lin et al.

(10) Patent No.: US 12,275,193 B2
(45) Date of Patent: Apr. 15, 2025

(54) FIBER CORE AUTO-TRACING METHOD, SYSTEM, AND STORAGE MEDIUM FOR FABRICATING FIBER GRATING

(71) Applicant: INNOFOCUS PHOTONICS TECHNOLOGY PTY LTD, Victoria (AU)

(72) Inventors: Han Lin, Victoria (AU); Baohua Jia, Victoria (AU); Jinchuan Zheng, Victoria (AU)

(73) Assignee: INNOFOCUS PHOTONICS TECHNOLOGY PTY LTD, Victoria (AU)

( * ) Notice: Subject to any disclaimer, the term of this patent is extended or adjusted under 35 U.S.C. 154(b) by 190 days.

(21) Appl. No.: 17/907,393

(22) PCT Filed: Jul. 1, 2020

(86) PCT No.: PCT/CN2020/099655
§ 371 (c)(1),
(2) Date: Sep. 26, 2022

(87) PCT Pub. No.: WO2021/189700
PCT Pub. Date: Sep. 30, 2021

(65) Prior Publication Data
US 2023/0117177 A1    Apr. 20, 2023

(30) Foreign Application Priority Data
Mar. 27, 2020    (CN) .......................... 202010230289.1

(51) Int. Cl.
*B29C 64/268*    (2017.01)
*B29C 64/393*    (2017.01)
(Continued)

(52) U.S. Cl.
CPC .......... *B29C 64/393* (2017.08); *B29C 64/268* (2017.08); *B33Y 10/00* (2014.12); *B33Y 50/02* (2014.12); *G02B 6/02147* (2013.01)

(58) Field of Classification Search
CPC . G02B 6/02147; B29C 64/268; B29C 64/393; B33Y 50/02; B33Y 10/00
See application file for complete search history.

(56) References Cited

U.S. PATENT DOCUMENTS

| 4,128,752 A | 12/1978 | Gravel |
| 4,190,321 A | 2/1980 | Dorer et al. |

(Continued)

FOREIGN PATENT DOCUMENTS

| CN | 1724997 A | 1/2006 |
| CN | 101201559 A | 6/2008 |

(Continued)

OTHER PUBLICATIONS

International Search Report dated Jan. 4, 2021 for Application No. PCT/CN2020/099656 (6 pages).

(Continued)

*Primary Examiner* — Monica A Huson
(74) *Attorney, Agent, or Firm* — Knobbe, Martens, Olson & Bear, LLP

(57) ABSTRACT

A fiber core auto-tracing method, system, and storage medium are for fabricating fiber gratings. The method includes acquiring the image of the optical fiber to be processed on the three-dimensional translation stage in real-time, adjusting the relative position of the optical fiber and the microscope objective in the Z-axis direction, until it is recognized that two boundary lines are formed between the fiber core and the cladding in the currently collected image calculating the position of the center point of the two boundary lines on the three-dimensional translation stage (Continued)

and adjusting the position of the fiber to be processed on the three-dimensional translation stage accordingly until the center point coincides with the XY coordinates of the laser focus. The method can quickly and accurately find the center point of the fiber core to be processed through the image recognition technology, to ensure processing accuracy.

13 Claims, 5 Drawing Sheets

(51) Int. Cl.
  *B33Y 10/00* (2015.01)
  *B33Y 50/02* (2015.01)
  *G02B 6/02* (2006.01)

(56) References Cited

U.S. PATENT DOCUMENTS

| | | | |
|---|---|---|---|
| 4,396,643 | A | 8/1983 | Kuehn et al. |
| 4,882,497 | A | 11/1989 | Inoue et al. |
| 5,483,055 | A | 1/1996 | Fairley et al. |
| 2003/0142915 | A1 | 7/2003 | Lefebvre |
| 2011/0181888 | A1 | 7/2011 | Abdulhalim et al. |
| 2013/0134294 | A1 | 5/2013 | Cooper et al. |
| 2013/0196083 | A1 | 8/2013 | Sharma et al. |
| 2014/0085725 | A1 | 3/2014 | Lochbihler et al. |
| 2018/0307138 | A1 | 10/2018 | Bilinsky |
| 2023/0106674 | A1 | 4/2023 | Lin et al. |
| 2023/0150056 | A1 | 5/2023 | Zheng et al. |
| 2023/0356324 | A1 | 11/2023 | Jia et al. |

FOREIGN PATENT DOCUMENTS

| | | | |
|---|---|---|---|
| CN | 101375191 | A | 2/2009 |
| CN | 101573204 | A | 11/2009 |
| CN | 102778713 | A | 11/2012 |
| CN | 102974936 | A | 3/2013 |
| CN | 103862166 | A | 6/2014 |
| CN | 106226895 | A | 12/2016 |
| CN | 107014793 | A | 8/2017 |
| CN | 107076964 | A | 8/2017 |
| CN | 108406141 | A | 8/2018 |
| CN | 109187726 | A | 1/2019 |
| CN | 109530912 | A | 3/2019 |
| CN | 109900357 | A | 6/2019 |
| CN | 110320745 | A | 10/2019 |
| CN | 110490846 | A | 11/2019 |
| CN | 111334012 | A | 6/2020 |
| CN | 112008237 | A | 12/2020 |
| CN | 213291604 | U | 5/2021 |
| CN | 213291633 | U | 5/2021 |
| CN | 113527740 | A | 10/2021 |
| JP | 2001150171 | A | 6/2001 |
| JP | 2003255157 | A | 9/2003 |
| WO | WO 2020237813 | A1 | 12/2020 |

OTHER PUBLICATIONS

International Preliminary Report of Patentability dated Sep. 22, 2022 for Application No. PCT/CN2020/099656 (8 pages).
International Search Report dated Dec. 30, 2020 for Application No. PCT/CN2020/099657 (6 pages).
International Preliminary Report of Patentability dated Sep. 22, 2022 for Application No. PCT/CN2020/099657 (8 pages).
International Search Report dated Dec. 23, 2020 for Application No. PCT/CN2020/099655 (7 pages).
International Preliminary Report of Patentability dated Sep. 22, 2022 for Application No. PCT/CN2020/099655 (9 pages).
International Search Report dated Oct. 26, 2021 for Application No. PCT/CN2021/108374 (7 pages).
International Preliminary Report of Patentability dated Feb. 28, 2023 for Application No. PCT/CN2021/108374 (6 pages).
International Search Report and Written Opinion issued in International Application No. PCT/CN2022/087864, dated Jun. 30, 2022 (11 pages).

FIBER CORE AUTO-TRACING METHOD, SYSTEM, AND STORAGE MEDIUM FOR FABRICATING FIBER GRATING

This application claims the priority of the Chinese patent application filed on Mar. 27, 2020, with the application number of 202010230289.1 and the invention titled "a fiber core auto-tracing method, system, and storage medium for fabricating fiber grating", which the entire contents of this application are incorporated by reference.

TECHNICAL FIELD

The invention relates to the technical field of laser fabrication, particularly a fiber core auto-tracing method, system, and storage medium for fabricating fiber grating.

TECHNICAL BACKGROUND

Laser nanofabrication, also known as laser 3D nanoprinting technology, has the advantages of simple processing equipment, fast and low-cost fabrication process, and 3D processing capability. It has become one of the most crucial emerging high-precision manufacturing technologies.

Laser 3D nanoprinting technology uses high light intensity in the focal region of a tightly focused laser beam that is usually focused by a microscope objective to the processing position. The laser focus is used to modify material properties to fabricate structures with nanometer precision in different materials (including polymers, glass, metals, new two-dimensional materials, etc.).

Using femtosecond laser 3D nanoprinting technology, structures with different functions can be fabricated, including polymer photonic crystal structures, ultrathin microlenses, miniature optical waveguides, and fiber gratings. Moreover, it has high spatial resolution due to the small affected area and can achieve nanometer positioning accuracy. Therefore, it has attracted extensive attention in micro/nanofabrication requiring ultrahigh precision.

Fiber Bragg grating is a grating with a periodic distribution of refractive index formed in the fiber core, the essence of which is to form a (transmission or reflection) filter or mirror in the fiber core. Taking advantage of this feature, many unique fiber-optics devices can be fabricated. Since the traditional fiber grating fabrication method uses an excimer laser combined with a phase mask, the fiber core must have high photosensitivity, and germanium and boron elements need to be doped in the fiber core. However, a pure silica fiber core has no photosensitivity, so traditional methods cannot fabricate fiber gratings in the silica fiber core. A new type of fiber grating fabrication technology based on femtosecond laser can solve the above problems very well. The use of femtosecond laser technology utilizes the advantages of high instantaneous energy, non-thermal processing, and high fabrication accuracy of a femtosecond laser. Compared with traditional methods, fabricating fiber gratings by femtosecond laser technology cannot only fabricate gratings in non-photosensitive fibers, such as pure silica fibers, fluoride fibers, etc., but also has other advantages. First, femtosecond laser fabrication does not require the use of phase masks, so it can get rid of the limitation of phase masks. In theory, fiber gratings working at any reflection wavelength can be fabricated, such as 2 μm and 3 μm fiber gratings in fluoride fibers. Secondly, a femtosecond laser can pass through the coating layer of the fiber (acrylate, polyimide, etc.). Therefore, the fiber coating layer does not need to be stripped during the fabrication process, which greatly improves the strength of the fabricated fiber grating. More importantly, the fiber grating fabricated by an excimer laser cannot withstand a high temperature. When the temperature is higher than 150 degrees, the performance of the fiber gratings begins to degrade, while the grating fabricated by a femtosecond laser can withstand a temperature up to 1000 degrees and can be used in high-temperature environments.

Due to its three-dimensional high-precision characteristics, it is particularly critical to control the relative position of the laser focus and the fiber core for grating fabrication during the fabrication process. Assuming that the fiber is perfectly mounted on the translation stage, the user must find the position of the fiber grating fabrication in a three-dimensional space.

This process usually involves one step: finding the x,y,z positions of the fiber core so that the laser can be focused in the center of the core in the XY plane and along z axis. In current femtosecond laser fabrication systems, this process is done by the user manually by human eye detection, which lacks accuracy and repeatability, so the inaccuracy caused by the alignment is inevitable, and the laser focus can not be guaranteed at the center position of the fiber core, which affects the quality of the gratings.

SUMMARY OF THE INVENTION

The purpose of the present invention is to provide a fiber core auto-tracing method, system, and storage medium for fabricating fiber gratings, to solve the problem existing in the prior art that the laser focus cannot be automatically and accurately focused a the center position of the fiber core and maintained during the fabrication process.

For this purpose, the present invention adopts the following technical solutions:

A fiber core auto-tracing method for laser fabricating fiber gratings, comprising:

Real-time acquisition of the image of the optical fiber on a three-dimensional translation stage. The X and Y axes are parallel to the plane of the three-dimensional translation stage, and the Z axis is perpendicular to the stage. The optical fiber to be processed includes a core and a cladding;

Adjust the relative position of the optical fiber and the microscope objective in the Z-axis direction until the two boundary lines at the interfaces between the fiber core and the cladding appear in the real-time collected image;

Calculate the center position of the two boundary lines;

According to the center position, adjust the position of the fiber until the XY coordinates of the center position coincide with the XY coordinates of the laser focus.

Optionally, the fiber core auto-tracing method further includes:

After the XY coordinates of the center position coincide with the XY coordinates of the laser focus, adjust the relative positions of the optical fiber and the microscope objective in the Z-axis direction until two boundary lines in the real-time collected images disappear.

Optionally, the fiber core auto-tracing method further includes:

According to the image, identify the angle between the length direction of the optical fiber relative to the fabrication direction of the grating;

According to the angle, the position of the optical fiber or the fabrication direction is adjusted in the XY plane until the length direction of the optical fiber is parallel to the fabrication direction of the grating.

Optionally, in the fiber core auto-tracing method, the two boundary lines are identified according to the gray level of the lines in the image.

A fiber core auto-tracing system for laser fabrication of fiber gratings, comprising: an image sensor, a three-dimensional translation stage, and a controller;

The image sensor is used to collect the image of the fiber on the three-dimensional translation stage in real-time. The X and Y axes are parallel to the plane of the three-dimensional translation stage, the Z-axis is perpendicular to the plane of the stage, and the X, Y, and Z axes form a three-dimensional coordinate system. The optical fiber to be processed includes a core and a cladding;

A three-dimensional translation stage is used to adjust the three-dimensional coordinate position of the optical fiber according to the command from the controller;

A controller is configured to control the three-dimensional translation stage to adjust the relative position of the optical fiber and the microscope objective in the Z-axis direction, until the two boundary lines at the interfaces between the fiber core and the cladding appear in the real-time acquired image. Calculate the center position of the two boundary lines on the three-dimensional coordinates. Adjust the fiber's position on the three-dimensional translation stage according to the center position until the XY coordinates of the center position coincide with the XY coordinates of the laser focus.

Optionally, the controller is also used to control the three-dimensional translation stage after the XY coordinates of the center position coincide with the XY coordinates of the laser focus, and adjust the Z position between the microscope objective and the fiber, until the two boundary lines disappear in the real-time acquired image.

Optionally, the controller is further configured to identify the angle between the length direction of the optical fiber and the grating fabrication direction according to the image, and control the three-dimensional translation stage according to the angle to adjust the position of the optical fiber or the fabrication direction in the XY plane until the length direction of the optical fiber is parallel to the fabrication direction of the grating.

Optionally, the controller is specifically configured to identify the two boundary lines according to the gray level of the lines in the image.

Optionally, the image sensor is a CCD camera.

A storage medium stores a plurality of instructions. The instructions are loaded by a processor to perform the steps in the method for auto-tracing a fiber core according to any one of the above.

Compared with the prior art, the embodiments of the present invention have the following beneficial effects:

The embodiment of the present invention can quickly and accurately find the center position of the fiber core to be processed through the image recognition technology, ensure processing accuracy, improve processing quality and yield, and simultaneously improve processing efficiency.

At the same time, since the embodiments of the present invention are mainly implemented in software, the hardware part only needs to use low-cost image sensors. No major changes are required to the existing laser processing system, so the entire solution is cost-effective.

DESCRIPTION OF DRAWINGS

In order to explain the embodiments of the present invention or the technical solutions in the prior art more clearly, the following briefly introduces the accompanying drawings that need to be used in the description of the embodiments or the prior art. Obviously, the accompanying drawings in the following description are only some embodiments of the present invention. For those of ordinary skill in the technical field, other drawings can also be obtained based on these drawings without any creative effort.

DETAILED IMPLEMENTATION METHODS

In order to make those skilled people in the field better understand the embodiments of the present invention, the following will clearly and completely describe the technical solutions in the embodiments of the present invention with reference to the accompanying drawings in the embodiments of the present invention. Obviously, the described implementations of the examples are only a part of the embodiments of the present invention, but not all of the embodiments. Based on the examples in the embodiments of the present invention, all other embodiments obtained by persons of ordinary skill in the field without creative work shall fall within the protection scope of the embodiments of the present invention.

The terms "comprising" and "having" in the description and claims of the embodiments of the present invention and the above-mentioned drawings and any variations thereof are intended to cover non-exclusive inclusion, for example, a process comprising a series of steps or units, a method, system, product or device is not necessarily limited to those steps or units expressly listed, but may include other steps or units not expressly listed or inherent to the process, method, product or device.

The embodiments of the present invention can be applied to a laser fabrication system, and the laser fabrication system mainly includes a laser and a microscope objective. Among them, the laser is used to output a laser beam; the microscope objective is used to focus the laser beam, and the laser beam is focused on the fiber to be processed.

In order to use the high light intensity at the laser focus to realize efficient and accurate grating fabrication in the fiber, the present invention provides a fiber core auto-tracing solution for laser fabrication of fiber gratings. Applying image recognition and control technology ensures that the laser focus can always be in the center position of the fiber core during the grating fabrication. It can effectively ensure fabrication accuracy and improve quality and yield.

For the convenience of description and understanding, in the embodiments of the present invention, the three-dimensional coordinate system in which the X and Y axes are parallel to the plane of the translation stage for placing the optical fiber to be processed, and the Z axis is perpendicular to the plane of the translation stage is used as an example for description. It can be understood that the directions of the X, Y, and Z axes and the corresponding XY plane in the three-dimensional coordinate system in practical applications can be changed according to specific equipment or system requirements, which are not limited to the present invention.

Figure 1:
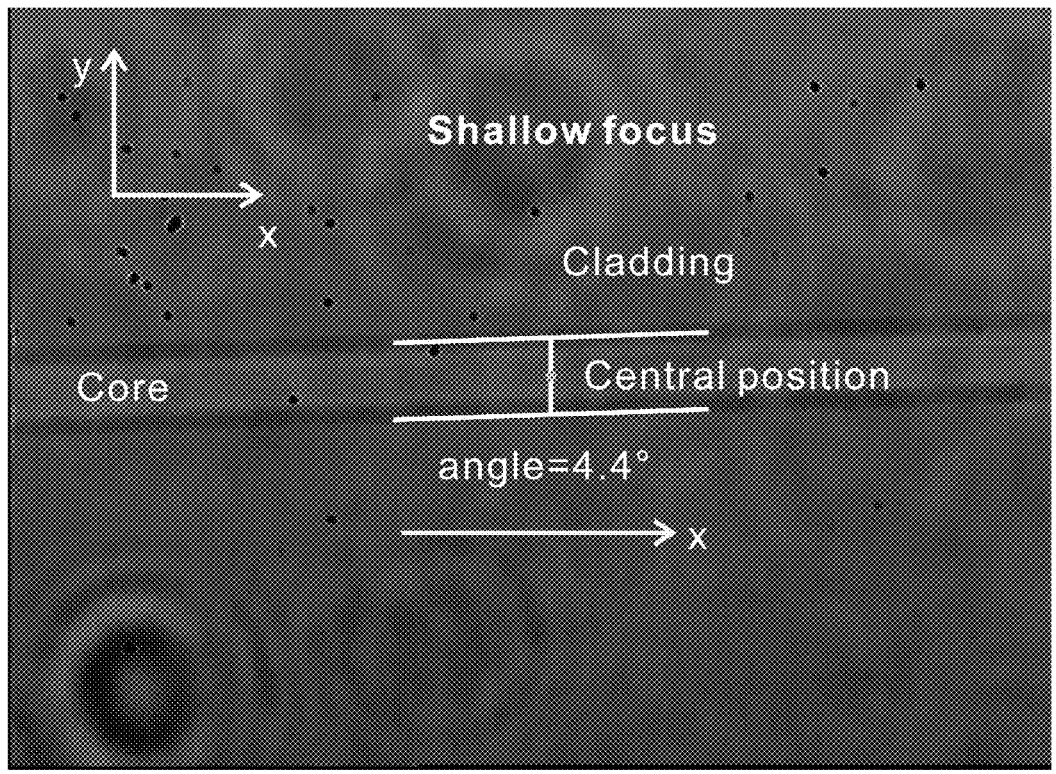
FIG. 1 is a schematic diagram of the state when the laser focus does not reach the center of the fiber core in the Z-axis direction (shallow focus)
Figure 2:
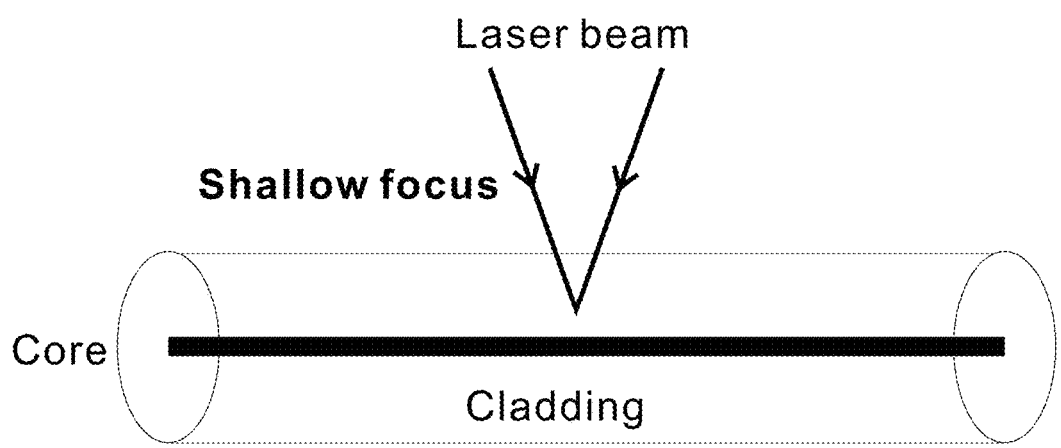
FIG. 2 is the collected image of the optical fiber to be processed in the state of FIG. 1.
Figure 3:
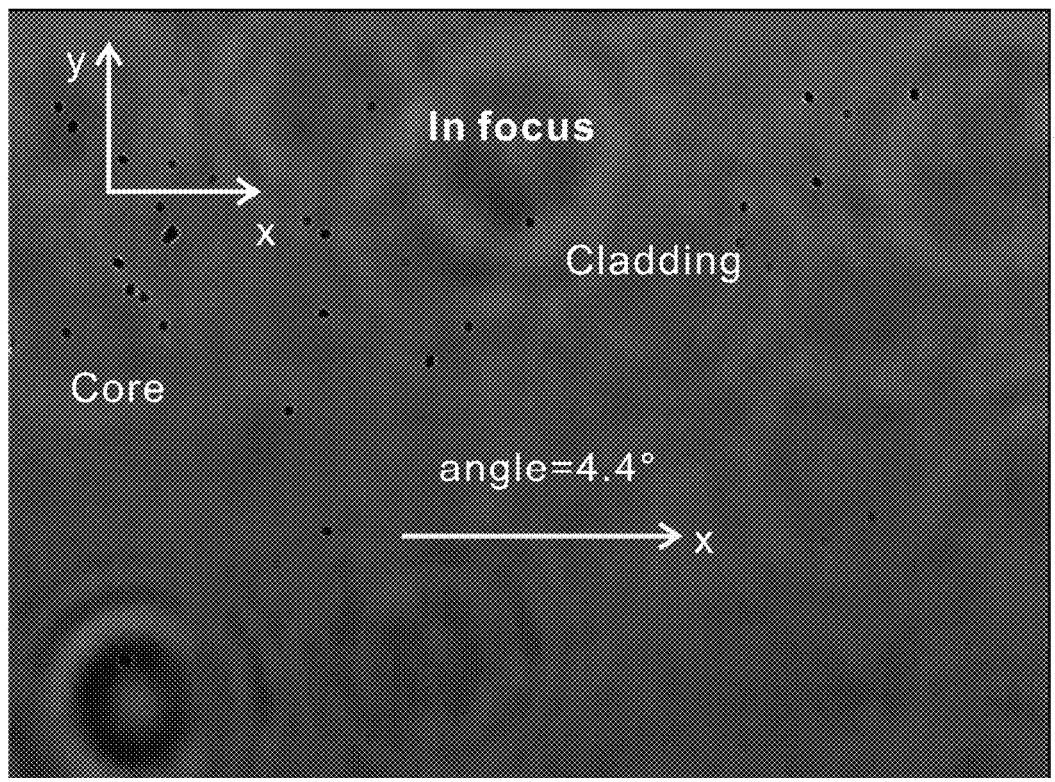
FIG. 3 is a schematic diagram of the state when the laser focus is at the center of the fiber core in the Z-axis direction (in focus)
Figure 4:
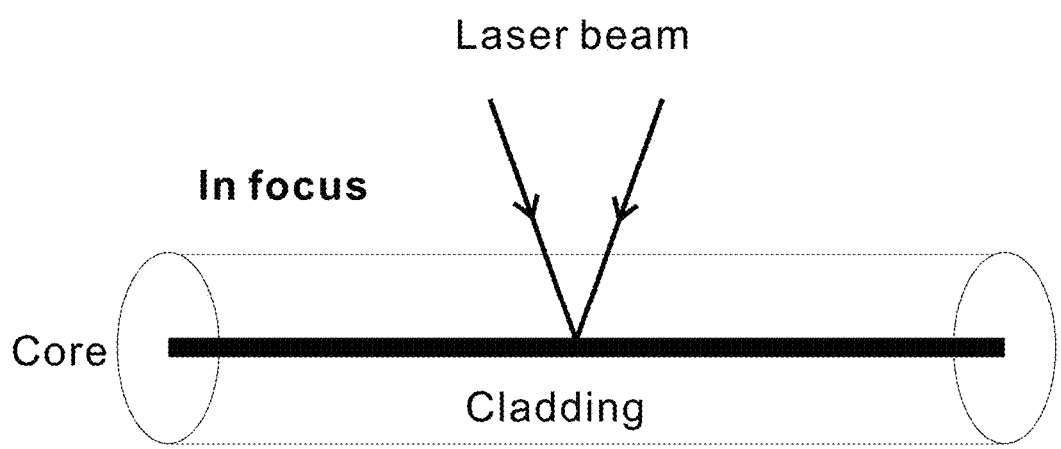
FIG. 4 is the collected image of the optical fiber to be processed in the state of FIG. 3.
Figure 5:
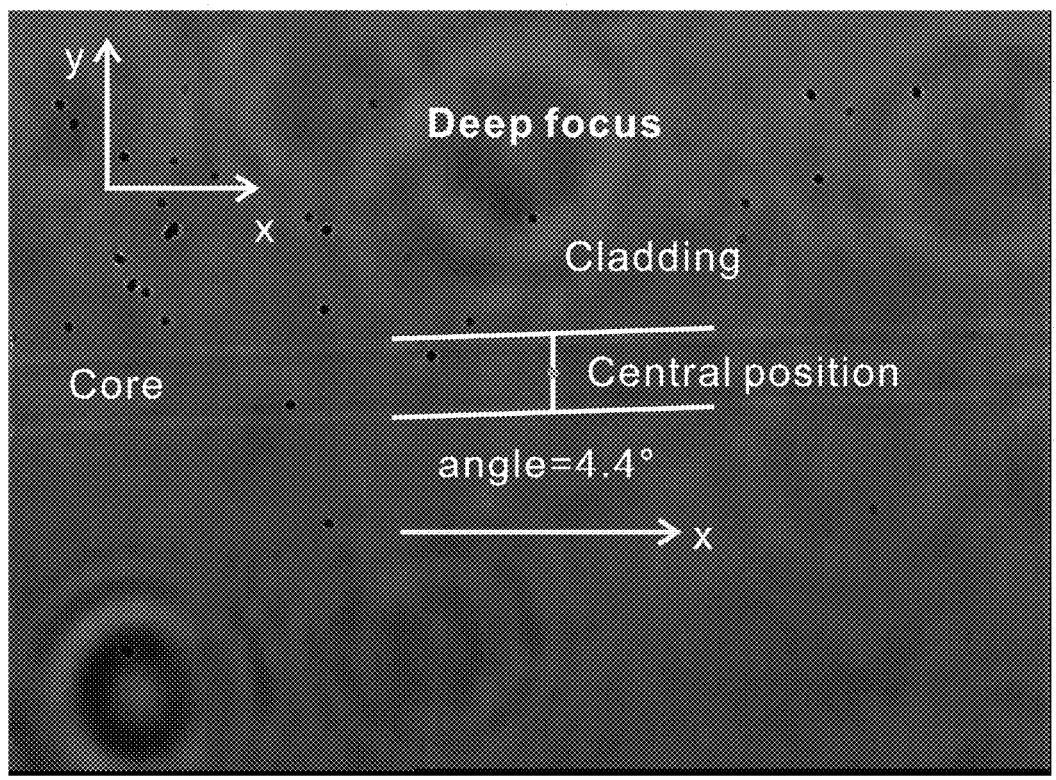
FIG. 5 is a schematic diagram of the state when the laser focus goes over the center of the fiber core in the Z-axis direction (deep focus)
Figure 6:
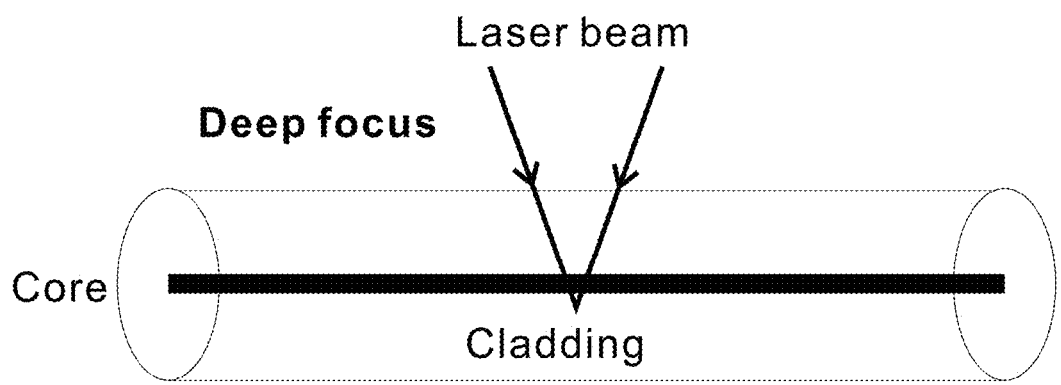
FIG. 6 is the collected image of the optical fiber to be processed in the state of FIG. 5.

Please refer to FIGS. 1 to 6. FIGS. 1 and 2 are the images of the fiber collected by the image sensor when the laser focus does not reach the center position of the fiber core in the Z-axis direction (hereinafter referred to as shallow focus); FIGS. 3 and 4 is the image of the fiber collected by the image sensor when the laser focus is at the center position of the fiber core in the Z-axis direction (hereinafter referred to as in focus); FIGS. 5 and 6 are the laser focus goes over the center position of the fiber core in the Z-axis direction (hereinafter referred to as deep focus).

When the fiber to be processed is placed in the field of view of laser fabrication setup, due to the refractive index difference between the core and the cladding of the fiber, diffraction will occur at the boundary between the core and the cladding. At the same time, according to the different focal positions of the microscope objective, the diffraction image will form different gray levels. Specifically, in the case shown in FIG. 1, the two boundary lines between the core and the cladding are shown as two black lines, as shown in FIG. 2. In the case shown in FIG. 3. The two boundary lines disappear, as shown in FIG. 4. In the case shown in FIG. 5, the two boundary lines between the core and cladding appear as two white lines, as shown in FIG. 6.

Therefore, based on the gray level of the boundary lines between the core and the cladding in the diffraction image, the relative position of the current laser focus to the center position of the fiber core in the Z-axis direction can be identified: If the boundary lines are two black lines, it can be determined as shallow focus. If the boundary line disappears, it can be determined as in focus. If the boundary line is two white lines, it can be determined as deep focus.

Figure 7:
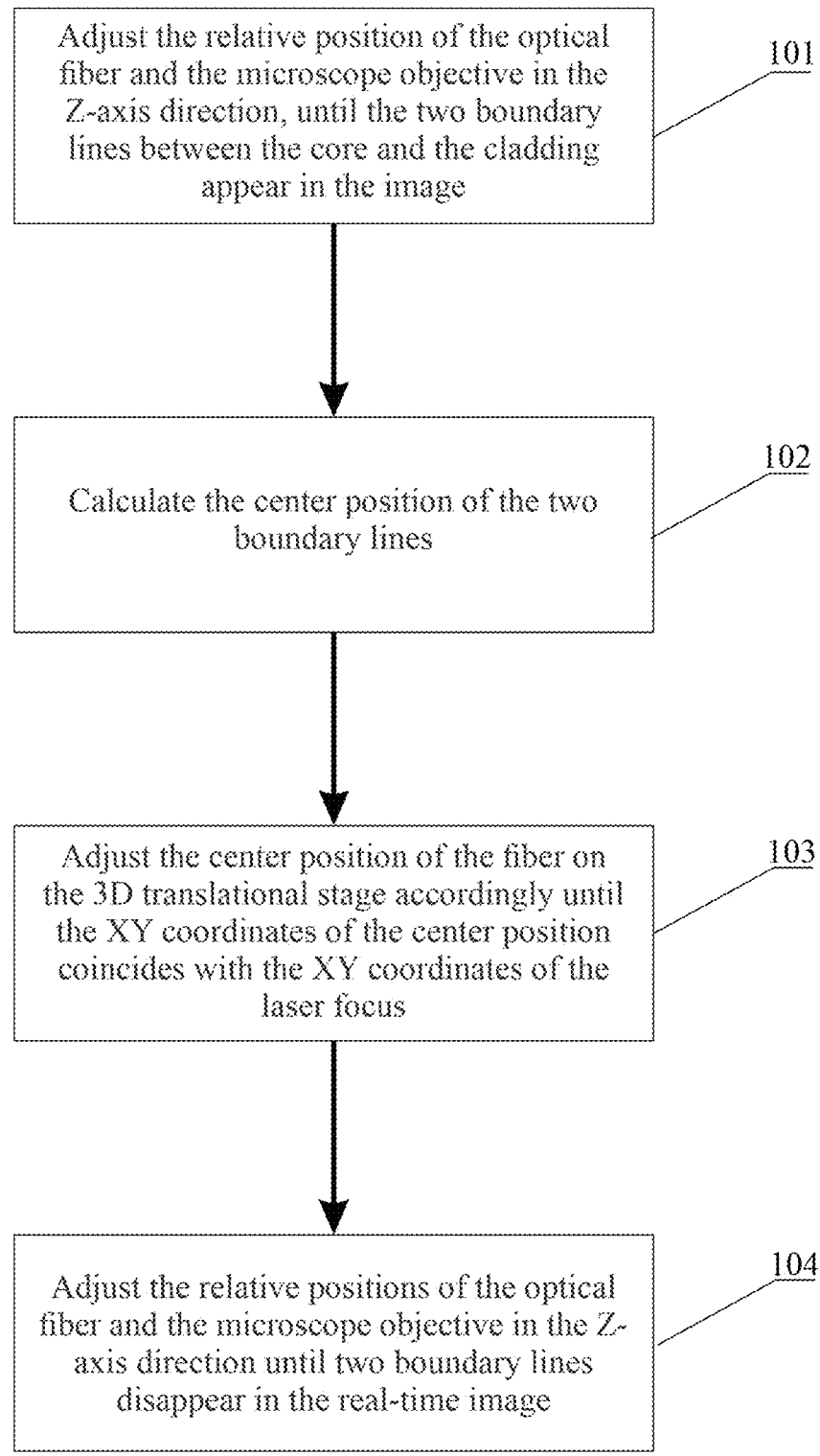
FIG. 7 is a flowchart of a method for auto-tracing a fiber core provided by an embodiment of the present invention.

Based on this, referring to FIG. 7, an auto-tracing method for locating the laser focus in the center of a fiber core is proposed as an embodiment of the present invention, which includes the steps of identifying and adjusting the position of the laser focus relative to the fiber core, and specifically includes:

Step 101: Adjust the relative position of the microscope objective and the fiber in the Z-axis direction until two visible boundary lines (which can be black lines or white lines) between the fiber core and the cladding appear in the real-time captured image. The laser focus can be shallow or deep.

Step 102: Calculate the center position of the two boundary lines when the focus is shallow or deep.

Step 103: Adjust the position of the fiber in the XY plane until the XY coordinates of the laser focus coincide with the XY coordinates of the center position of the two boundary lines.

It should be noted that the current position of the laser focus on the XY plane is known, and the position of the laser focus can be found before the auto-tracing operation is performed. Generally, it will be adjusted to the center of the image taken by the camera, and then the software will recognize it. The relative position of the laser focus in the XY plane to the center position of the fiber core can be determined.

So far, the position alignment of the fiber core and the laser focus in the XY plane has been achieved.

Step 104: Adjust the relative position of the microscope objective and the fiber in the Z-axis direction until the two boundary lines disappear in the real-time image, that is, the laser focus reaches the correct focus state, thereby the laser focus is at the center position of the fiber core. The laser is turned off during the entire auto-tracing process so it does not cause any damage to the fiber core.

Figure 8:
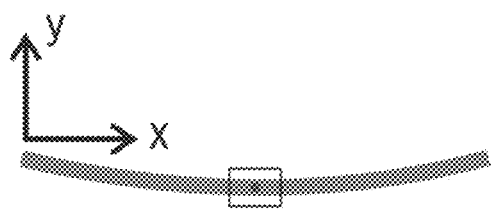
FIG. 8 is a schematic diagram of the bending state of the optical fiber to be processed.
Figure 9:
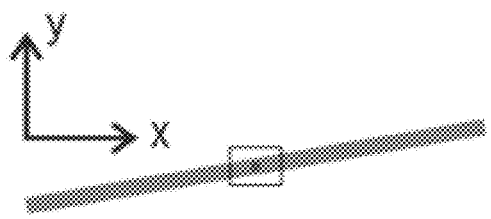
FIG. 9 is a schematic diagram of the inclined state of the optical fiber to be processed.

Assuming the fiber does not have any bends or tilts, accurate grating processing only needs to be applied once to find the focal position during the entire manufacturing process. However, in practice, the fiber tends to be bent (as shown in FIG. 8) or tilted (as shown in FIG. 9). The required length of a fiber grating is quite long, for example, 20 mm, and a 1° angle of inclination or bending will result in a 350-micron displacement, making the fiber grating unable to be fabricated in the fiber core, which will seriously affect fabrication quality.

Currently, fiber mounting is done manually by the user, which largely depends on the user's experience. The angle recognition accuracy of the human eye varies from person to person, but it is difficult to reduce the tilt angle to less than 1°. What's more, manual alignment cannot take into account fiber bends.

To this end, the fiber core auto-tracing method of this embodiment also provides the steps of identifying and adjusting the tilt angle of the fiber relative to the grating processing direction, which specifically includes:

Obtain the image of the optical fiber on the translation stage, and identify the angle between the length direction of the optical fiber and the processing direction of the grating according to the image;

According to the angle, adjust the position of the optical fiber in the XY plane or the fabrication direction until the length direction of the optical fiber is parallel to the processing direction of the grating. Here adjusting the fabrication direction can also work.

It should be noted that, during the grating processing, the above-mentioned position adjustment operation of the optical fiber relative to the grating fabrication direction can be performed intermittently and repeatedly, and then the above-mentioned position adjustment operation of the laser focus relative to the optical fiber can be performed.

To sum up, this embodiment can quickly and accurately find the center position of the fiber core through the image recognition technology and is suitable for the scene where the fiber is tilted and/or bent, to ensure the fabrication accuracy, improve the quality and the yield at the same time. In addition, the fully automated process can improve processing efficiency.

The whole scheme is mainly implemented by software. Only low-cost image sensor is needed as hardware, no major changes are required to the existing laser nanofabrication system, and it is cost-effective.

In addition, in some cases, if the optical fiber cannot be guaranteed to be completely clean, the algorithm control in this embodiment can ensure that the software can accurately find the optical fiber core without being affected by dust, thereby ensuring reliability.

Embodiment 1

This embodiment provides a fiber core auto-tracing system for laser fabrication of fiber gratings, including: an image sensor, a three-dimensional translation stage, and a controller.

The image sensor is used to collect the image of the fiber on the three-dimensional translation stage in real-time. The X and Y axes are parallel to the plane of the three-dimensional translation stage, and the Z axis is perpendicular to the plane of the translation stage. The X, Y, and Z axes form a three-dimensional coordinate system. Specifically, the image sensor may be a CCD camera, which captures images/videos at a frame rate determined by the camera specification.

The three-dimensional translation stage is used to adjust the position of the fiber in the three-dimensional coordinate system according to the controller's command.

The controller takes the real-time image from the image sensor as input and generates a control command for the three-dimensional translation stage to adjust the three-dimensional position of the fiber so that the laser can remain focused at the center of the fiber core.

The controller is specifically used to control and adjust the relative position of the optical fiber and the microscope objective in the Z-axis direction until the two boundary lines at the interfaces between the core and the cladding of the optical fiber appear in the real-time collected image; calculate the center position of the two boundary lines; according to the center position, adjust the position of the fiber on the 3D translation stage until the XY coordinates of the center position coincide with the XY coordinates of the laser focus. Then adjust the relative position of the microscope objective and the fiber in the Z-axis direction until the two boundary lines in the image disappear.

The application scenarios of this embodiment mainly include two types: optical fiber tilting and optical fiber bending. As shown in FIG. 8 and FIG. 9, the black rectangle in the figure represents the field of view of the microscope objective. Since processing fiber gratings requires high precision, oil immersion objective lenses with high numerical apertures are usually required. Usually, the field of view of the oil immersion objective lens is within 100 μm. However, the required length of the fiber grating is usually several millimeters to several tens of millimeters. Therefore, it is impossible to see whether the optical fiber tilted or bent clearly in the field of view. This presents a great challenge for manual correction. By using the fiber core auto-tracing system of the present invention, the focusing and tilting conditions of the fiber to be processed within the field of view can be monitored in real-time. Real-time correction can be achieved, providing a reliable guarantee for high-precision fabricating fiber gratings.

In this embodiment, the detector is implemented by software, and only a low-cost image sensor is required as hardware, and machine vision is used for recognition. In general, this embodiment is a cost-effective solution that does not require major changes to the existing laser fiber grating fabrication system. At the same time, this embodiment can determine whether the focus is deep or shallow by identifying the gray level of the boundary to provide adjustment direction information. At the same time, the software can directly adjust the angle of the fiber core by directly detecting the angle between the fiber core and the X or Y axis. The fiber direction is aligned with the fabrication direction, thus reducing the requirements for the accuracy of fiber mounting.

Embodiment 2

Those of ordinary skill in the field can understand that all or part of the steps in the above-mentioned auto-tracing method can be completed by instructions, or completed by instructions to control relevant hardware, and the instructions can be stored in a computer-readable storage medium, and loaded and executed by processors.

To this end, the embodiments of the present invention further provide a storage medium, in which a plurality of instructions are stored, and a processor can load the instructions to execute the fiber core auto-tracing for laser fabricating fiber gratings provided by the steps in the embodiments of the present invention.

Wherein, the storage medium may include: a read-only memory (ROM, Read Only Memory), a random access memory (RAM, Random Access Memory), a hard disk or an optical disk, and the like.

As mentioned above, the above embodiments are only used to illustrate the technical solutions of the present invention, but not to limit them. Although the present invention has been described in detail with reference to the above embodiments, those of ordinary skill in the field should understand: The technical solutions described in the embodiments are modified, or some technical features thereof are equivalently replaced; and these modifications or replacements do not make the essence of the corresponding technical solutions depart from the spirit and scope of the technical solutions of the embodiments of the present invention.

The invention claimed is:

1. A fiber core auto-tracing method for laser fabrication of fiber grating, the method comprising:
real-time acquisition of an image of an optical fiber to be processed on a three-dimensional translation stage; the three-dimensional translation stage being parallel to an X axis and a Y axis, and perpendicular to a Z axis, the X-axis, the Y-axis and the Z-axis forming a three-dimensional coordinates system, wherein the optical fiber includes a fiber core and cladding and is to be processed using a laser with a laser focus at an XY coordinate;
adjusting a relative position of the optical fiber and a microscope objective in a direction along the Z-axis until two boundary lines between the fiber core and the cladding are identified in the acquired image;
calculating the position of the center point between the two boundary lines on the three-dimensional translation stage to determine an XY coordinate of the position of the center point;
according to the position of the center point, adjusting the position of the optical fiber on the three-dimensional translation stage until the XY coordinate of the center point coincides with the XY coordinate of the laser focus.

2. The fiber core auto-tracing method according to claim 1, further comprising:
after the XY coordinate of the center point coincides with the XY coordinate of the laser focus, adjusting the relative position of the optical fiber and the microscope objective in the Z-axis direction until the two boundary lines disappear from the acquired image.

3. The fiber core auto-tracing method according to claim 1, further comprising:
using the acquired image, identifying an angle between a length direction of the optical fiber and a direction of grating fabrication;
according to the angle, adjusting the position of the optical fiber in an XY plane until the length direction of the optical fiber is parallel to the direction of grating fabrication.

4. The fiber core auto-tracing method according to claim 1, wherein the two boundary lines are identified according to a gray level of the acquired image.

5. A fiber core auto-tracing system for laser fabrication of fiber gratings, comprising: an image sensor, a three-dimensional translation stage, and a controller; wherein:

the image sensor is configured for real-time acquisition of an image of an optical fiber to be processed on the three-dimensional translation stage; the three-dimensional translation stage being parallel to an X axis and a Y axis, and perpendicular to a Z axis, the X-axis, the Y-axis and the Z-axis forming a three-dimensional coordinates system, wherein the optical fiber includes a fiber core and cladding and is to be processed using a laser with a laser focus at an XY coordinate;

the three-dimensional translation stage is configured for adjusting the three-dimensional coordinate position of the optical fiber in the three-dimensional coordinate system according to a control command from the controller;

the controller is configured for: controlling the three-dimensional translation stage to adjust the relative position of the optical fiber and the microscope objective in the Z-axis direction until two boundary lines between the fiber core and the cladding are identified in the acquired image; calculating the position of the center point between the two boundary lines on the three-dimensional translation stage; and controlling the three-dimensional translation stage to adjust the position of the optical fiber on the three-dimensional translation stage, according to the position of the center point, until an XY coordinate of the center point coincides with the XY coordinate of the laser focus.

6. The fiber core auto-tracing system according to claim 5, wherein the controller is further configured to control the three-dimensional translation stage after the XY coordinate of the center point coincides with the XY coordinate of the laser focus to adjust the relative position of the microscope objective and the optical fiber in the Z-axis direction until the two boundary lines disappear from the acquired image.

7. The fiber core auto-tracing system according to claim 5, wherein the controller is further configured:

to identify an angle between a length direction of the optical fiber and a direction of grating fabrication; and according to the angle, to control the three-dimensional translation stage to adjust the position of the optical fiber in an XY plane until the length direction of the optical fiber is parallel to the direction of grating fabrication.

8. The fiber core auto-tracing system according to claim 5, wherein the controller is specifically configured to identify the two boundary lines according to a gray level of the acquired image.

9. The fiber core auto-tracing system according to claim 5, wherein the image sensor is a CCD camera.

10. A storage medium, wherein the storage medium stores a plurality of instructions, and the instructions are adapted to be loaded by a processor to execute the steps in the fiber core auto-tracing method according to claim 1.

11. A storage medium according to claim 10, wherein the fiber core auto-tracing method further comprises:

after the XY coordinates of the center point coincide with the XY coordinates of the laser focus, adjusting the relative position of the optical fiber and the microscope objective in the Z-axis direction until the two boundary lines disappear from the acquired image.

12. A storage medium according to claim 10, wherein the fiber core auto-tracing method further comprises:

using to the acquired image, identifying an angle between a length direction of the optical fiber and a direction of grating fabrication;

according to the angle, adjusting the position of the optical fiber in an XY plane until the length direction of the optical fiber is parallel to the direction of grating fabrication.

13. A storage medium according to claim 10, wherein the fiber core auto-tracing method comprises:

identifying the two boundary lines according to a gray level of the acquired image.

* * * * *